United States Patent
Gross

[11] 3,802,060
[45] Apr. 9, 1974

[54] NUTPLATE RIVETING DEVICE AND METHOD

[75] Inventor: Donald S. Gross, Sunnymead, Calif.

[73] Assignee: Rohr Industries, Inc., Chula Vista, Calif.

[22] Filed: July 24, 1972

[21] Appl. No.: 274,387

Related U.S. Application Data

[62] Division of Ser. No. 60,247, Aug. 3, 1970, Pat. No. 3,758,933.

[52] U.S. Cl............... 29/464, 29/243.53, 29/526
[51] Int. Cl.............................................. B23q 3/06
[58] Field of Search. 29/407, 400 D, 200 P, 243.53, 29/243.54, 464, 526

[56] References Cited
UNITED STATES PATENTS

| | | | |
|---|---|---|---|
| 3,646,660 | 3/1972 | Sheffer, Jr. | 29/243.53 |
| 2,405,779 | 8/1946 | Davis | 29/243.53 |
| 2,925,748 | 2/1960 | Ross | 29/243.54 |
| 3,518,745 | 7/1970 | Gray et al. | 29/243.53 |

Primary Examiner—Roy Lake
Assistant Examiner—J. W. Davie

[57] ABSTRACT

A drill and rivet aligning pilot pin on a lower pressure foot passes through a hole in a nut plate to index the same on the lower pressure foot. An upper pressure foot has a stepped projection which is receivable into an aperture in the workpiece and is also receivable into the nut of the nutplate as the pressure feet are brought together to clamp the nutplate and workpiece therebetween. The nut and workpiece aperture are thus properly aligned for drilling of the workpiece and the insertion and squeezing of a rivet.

4 Claims, 7 Drawing Figures

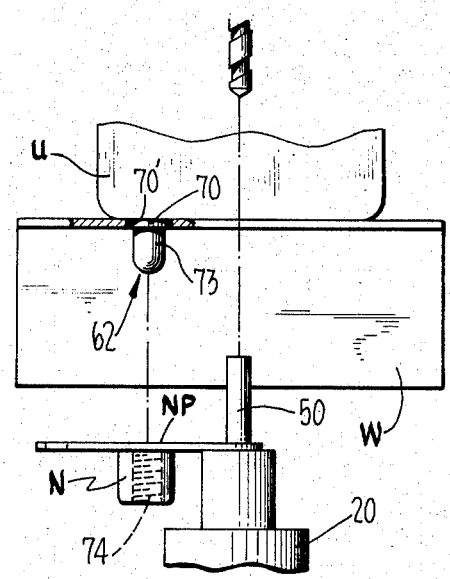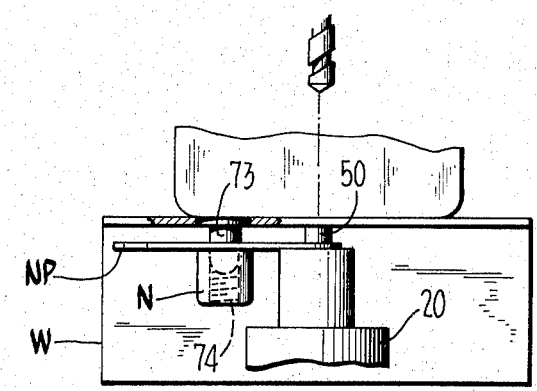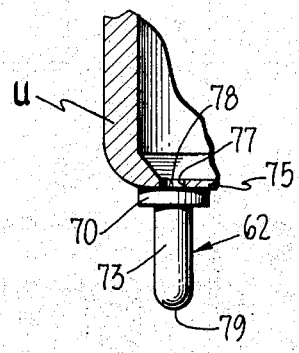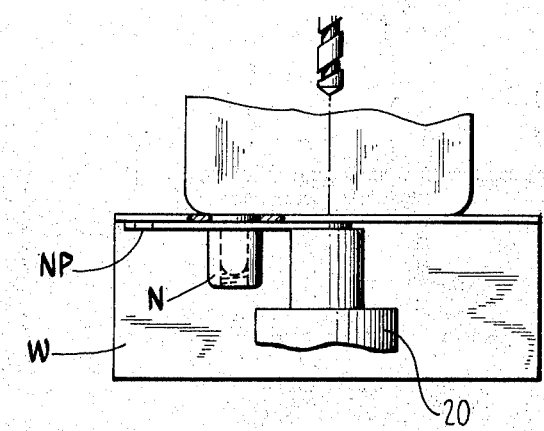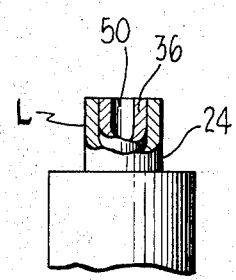

NUTPLATE RIVETING DEVICE AND METHOD

This is a division of application Ser. No. 60,247, filed Aug. 3, 1970, now U.S. Pat. No. 3,758,933.

The present invention relates to drilling and riveting machines and more particularly to an attachment device therefor which indexes a nutplate and workpiece for riveting in proper alignment.

The present application is related to the copending application of Gerret W. Gregory for NUTPLATE RIVETING DEVICE AND METHOD, Ser. No. 47,541, filed June 18, 1970, now U.S. Pat. No. 3,729,809, wherein a temporary screw is used to attach a nutplate to a workpiece preparatory to drilling the workpiece and riveting the nutplate thereto. The present invention is directed to an improvement in the device and method of the copending application.

The device and method of the aforesaid application are highly effective in reducing the time and cost of drilling the workpiece and riveting the nutplate thereto. However, considerable time is involved in screwing the nutplate to the workpiece in preparation for the drilling and riveting, and removal of the screw thereafter.

The desirability of minimizing the time spent on the screwing and unscrewing, or preferably omitting such operation altogether, in the interest of cost reduction is readily apparent.

SUMMARY OF THE INVENTION

The present invention therefore contemplates and is concerned with drilling and riveting machines and has as its primary purpose the provision of a nutplate riveting attachment device and method which rivets a nutplate to a workpiece in a rapid and reliable manner resulting in quality workmanship with an attendant saving of time and reduction in costs.

Another object is to provide a device which indexes the workpiece in proper relation for drilling and aligns the nut of the nutplate with an aperture in the workpiece.

These and other objects and advantages are achieved by the provision of a pair of aligned upper and lower pressure feet, the upper pressure foot having indexing means in the form of a stepped projection for locating a nutplate and an apertured workpiece in proper alignment with each other. The lower pressure foot has a pressure applying surface from which a spring loaded pilot pin projects to receive a hole in the nutplate. When the pressure feet are brought together the projection enters the nut to align the same with the aperture in the workpiece, and the pilot pin is engaged by the workpiece and retracted thereby. After drilling a perforation in line with the pilot pin, a rivet is inserted causing further retraction of the pin. Eventually, the pilot pin becomes coterminal with a surrounding member and therewith forms a rivet squeezing anvil.

BRIEF DESCRIPTION OF THE DRAWINGS

FIG. 3 is a somewhat enlarged view of a portion of the upper pressure foot shown in FIG. 2.

FIGS. 4, 5 and 6 show the series of steps involved in aligning a nutplate and workpiece preparatory to drilling the workpiece riveting the nutplate thereto.

FIG. 7 is a fragmentary sectional view of the lower pressure foot.

DESCRIPTION OF EMBODIMENTS

Figures 1, 2:
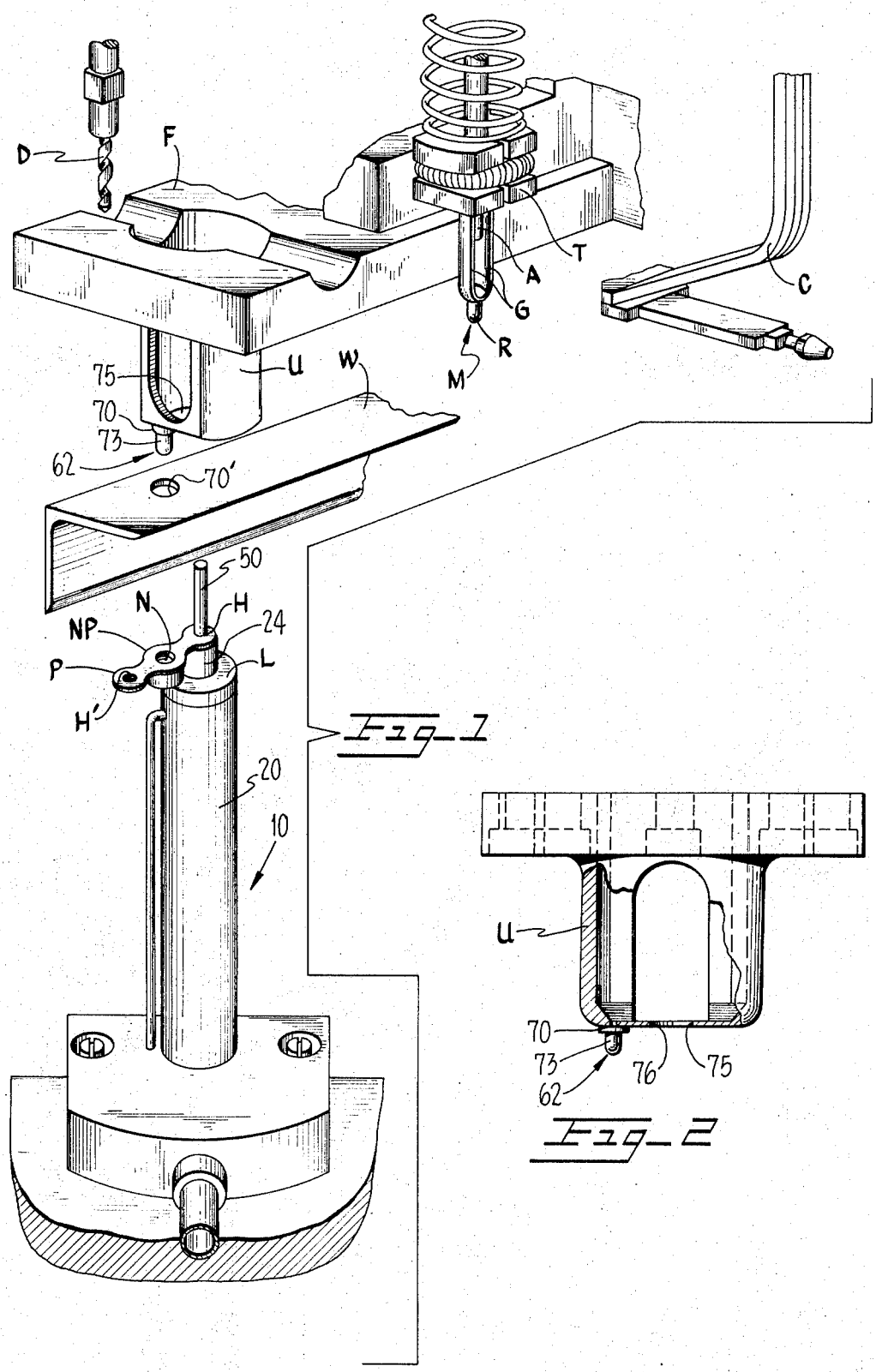
FIG. 1 is a fragmentary perspective view showing a drilling and riveting machine embodying the principles of the present invention.
FIG. 2 is a front elevational view, partially in section, of an upper pressure foot modified in accordance with the present invention.

Referring now to the drawings and first more particularly to FIG. 1, a nutplate riveting attachment device 10 is shown fragmentarily in relation to a drilling and riveting machine M, also fragmentarily shown. The machine M can be of any suitable type, that illustrated being typical of "Drivmatic" models manufactured by General-Electro-Mechanical Corporation of Buffalo, New York. Such machines have a frame or base F mounting an apertured upper pressure foot U, a drill D and a rivet transfer means T. The rivet transfer means are equipped with the usual spring loaded fingers G for gripping a rivet R and a vertically moving anvil A for engaging the head of the rivet for forcing it from the fingers and holding it during squeezing of the rivet. The rivet can be placed in the gripping fingers manually or fed automatically from a rivet feed chute C.

The device 10 is similar to the device described in the aforementioned copending application and further reference may be had to that application for details of construction and operation. It suffices to state herein that device 10 is mounted on a vertically movable portion of the machine M in vertical alignment with the pressure foot U and that the device 10 has a retractable elongated pilot pin 50 which extends slidably through a sleeve 36 disposed within the collar 24 of the upper end of housing 20, FIG. 7. As will later be made more clear, the device 10 is adapted to hold and index a nutplate NP relative to a hole in the nutplate, and the pressure foot U is adapted to index a workpiece W and also to align an aperture in the same with the nut of the nutplate as the nutplate and workpiece are brought together and clamped for drilling the workpiece and riveting the nutplate thereto.

The nutplate includes a plate P having a nut N and holes H, the pilot pin being engaged in one of the holes. With the pin so engaged the nutplate is indexed on the housing 20 which serves as a lower pressure foot L.

As shown in FIG. 1 depending from the upper pressure foot U is a stepped projection generally designated 62 which is adapted to to received in an aperture 70' in the workpiece W for indexing the same on the pressure foot U, the larger diameter portion or step 70 of the projection interfitting slidably within the aperture 70' in the workpiece and having an axial length corresponding approximately to the thickness of the sheet material from which the workpiece is fabricated. The projection 62 also serves to index the nut N when the housing 20 of the lower pressure foot L is brought up to the pressure foot U for clamping the nutplate NP and workpiece W in proper alignment for drilling and riveting, the smaller diameter portion or step 73 of the projection being received substantially interfittingly within the threaded opening 74 in the nut N. The projection 62 is suitably made of a material which will not harm the nut or its threads upon slidably entering the same.

Referring now to FIGS. 2 and 3, it will be seen that the upper pressure foot U is generally of hollow, open construction, and has a very thin bottom plate 75 as required for effective operation of the rivet gripping fingers G therewithin. A central opening 76 in plate 75 provides for passage therethrough of the drill D and rivet R.

The pressure foot U, without the addition of the projection 62, is conventional. To accommodate the projection, a small hole 77 is provided in plate 75 to receive interfittingly therewith a small diameter terminal portion 78 of projection 62. The larger diameter portion 70 of the projection is seated against the lower surface of plate 75, and these engaging surfaces of the projection and plate are suitably bonded or joined together as by brazing. The other terminal end portion 73 is rounded as at 79 to facilitate the entry of the pilot projection 73 into the opening 74 in nut N of the nutplate NP.

Stated in summary, the pilot projection 62 suitably may be made from steel, nylon, or other suitable materials. It may be riveted, bonded, screwed, or otherwise secured to the pressure foot. It may be removably secured to the pressure foot, as by making a snap action or press fit type attachment thereto. The bonding may be accomplished by brazing, welding, or use of adhesives. The projection may be machined or otherwise formed integrally with the pressure foot. The length and diameter of the pilot projection will depend upon the size of the nutplate and the workpiece being assembled therewith.

OPERATION

It is believed that the operation of the device of the present invention is clearly apparent and is briefly summarized at this point.

Referring to FIGS. 1, 4, 5 and 6, the nutplate NP is indexed on the housing 20 by engaging the pilot pin 50 in a hole H. The workpiece W is indexed on the upper pressure foot U by engaging the pilot projection step 70 in the aperture 70' in the workpiece. The machine M is then operated to move the housing 20 up and clamp the nutplate NP against the workpiece W. In the process step 73 of the pilot projection 62 enters the threaded opening 74 in nut N of the nutplate to thus align it properly with the aperture 70' in the workpiece W, and the pilot pin 50 engages the workpiece and is retracted thereby.

The drill D is now moved into alignment with the pin 50 and descends and perforates the workpiece and enters the aligned hole H. The drill is then retracted and moved away. The fingers G and upper anvil A are next aligned with the pressure feet and operate to insert a rivet R in the perforation and hole and hold it there, the rivet causing retraction of the pilot pin 50. The pilot pin moves down until its upper end surface is coterminal, that is, is even with the upper end surface of sleeve 36 after which the pin and sleeve move together upwardly as a lower anvil to squeeze the lower end of the rivet. With this the riveting operation is completed and the parts of the machine M are returned to starting position.

To rivet the other end of the nutplate, the workpiece and nutplate are removed and manipulated to insert the pilot pin 50 in the free hole. The machine is then operated to clamp, drill and rivet, as before described.

There has thus been provided a nutplate riveting device and method which operates to rivet a nutplate to a workpiece in a rapid and reliable manner with quality workmanship and a resultant reduction in the number of rejects, time, labor and cost.

Although the present invention has been herein shown and described in considerable detail in what is believed to be the most practical and preferred embodiment thereof, it is to be understood that many variations thereof are possible and that the present invention is not to be limited to such details but is to be considered in its broadest aspects and accorded the full scope of the appended claims.

Having described the invention, what is claimed as new and desired to be protected by U.S. Letters Patent is:

1. A method using an upper pressure foot and a lower pressure foot for riveting a nutplate to a workpiece in proper alignment with an aperture in the workpiece, said nutplate including a nut and a plate with a hole therein, said lower pressure foot having a pilot pin, said method comprising the steps of:
   a. indexing a nutplate on the lower pressure foot by passing the pilot pin of the pressure foot through the hole of the nutplate;
   b. indexing the workpiece on the upper pressure foot to align the workpiece aperture thereon;
   c. bringing the pressure feet together and concurrently aligning said nut with said workpiece aperture;
   d. axially aligning said nutplate hole and said pilot pin with a work station, axially aligning a drill with said work station for displacing the pilot pin and perforating the workpiece to provide a perforation therein axially aligned with said hole.

2. The method of claim 1 wherein the workpiece is indexed by engagement of a projection in said aperture, and said projection is received in said nut for aligning the same with said aperture.

3. The method of claim 1 wherein said workpiece is indexed on the upper pressure foot by a projection thereon which passes through said aperture in the workpiece and is receivable in said nut when the pressure feet are brought together.

4. The method of claim 3 wherein the pilot pin is axially aligned with a work station with which drilling and riveting means are selectively alignable for perforating the workpiece to provide a perforation therein axially aligned with said hole and for insertion of a rivet therein and squeezing of the same.

* * * * *